United States Patent [19]

Titterington et al.

[11] Patent Number: 5,316,644
[45] Date of Patent: May 31, 1994

[54] HIGH PRESSURE ELECTROCHEMICAL CELL STRUCTURE

[75] Inventors: William A. Titterington, Stratham, N.H.; Andrei Leonida, West Hartford, Conn.

[73] Assignee: United Technologies Corporation, Hartford, Conn.

[21] Appl. No.: 900,998

[22] Filed: Jun. 19, 1992

[51] Int. Cl.$^5$ .............................................. C25B 11/03
[52] U.S. Cl. .................... 204/284; 204/280; 204/283; 429/134
[58] Field of Search ............. 204/280, 284, 290 R, 204/242, 275, 252, 253, 263, 257, 254, 285; 429/34; C25B 11/02, 11/04

[56] References Cited

U.S. PATENT DOCUMENTS 2,969,315 1/1961 Bacon .................................. 204/284
4,432,858 2/1984 Schmitt et al. ...................... 204/284

*Primary Examiner*—Kathryn Gorgos
*Attorney, Agent, or Firm*—Malcolm J. Chisholm, Jr.

[57] ABSTRACT

An electrochemical cell electrode plate includes a laminar and preferably laminated assembly of at least two substantially identically configured plate-shaped components of an electrically conductive high-strength material, each including a fluid-pervious central portion and a solid frame portion integral with and surrounding the central portion. At least one through aperture is provided in the frame portion and forms a continuous fluid-flow conduit with the corresponding aperture of the other component. The frame portion of each of the components has at least one channel therein that is situated between the aperture and the central portion and opens onto the first major surface. The channels of the two components may be constituted by interrupted rows of mutually staggered slots that complement each other into a continuous passage that establishes communication between the aperture and at least one of the spaces of the central portion of one of the components.

8 Claims, 2 Drawing Sheets

HIGH PRESSURE ELECTROCHEMICAL CELL STRUCTURE

TECHNICAL FIELD

The present invention relates to electrochemical cell devices in general, and more particularly to an electrochemical cell structure designed to be operated at high pressures.

BACKGROUND ART

There are already known various constructions of electrochemical cell devices; most if not all of which include a multitude of individual electrochemical cells that are arranged in groups or stacks. Depending on their intended use, such electrochemical cell devices fall in two categories: electrolysis cells in which water or another liquid substance is electrolytically dissociated into its components (oxygen and hydrogen when the substance is water), or fuel cells in which hydrogen or other gaseous fuel and oxygen are catalytically combined, usually in order to generate electricity in the process.

While these two kinds of electrochemical cell devices may be different in some respects, given the different tasks to be performed by them, they also have many features in common. As is well known, each cell of any such device includes an anode electrode plate, a cathode electrode plate, and an electrolyte confinement body (membrane or porous matrix) which contains a quantity of electrolyte or other ion transfer or exchange medium and is disposed at least between active areas of the anode and cathode electrode plates. To enable or enhance the electrochemical reaction, a layer containing a quantity of a catalyst, such as platinum, is typically present at each of the interfaces between the respective electrode plate and the electrolyte confinement body. An electrically conductive separator plate or a similar plate-shaped member (such as a cooling device) is usually interposed between the cathode and anode electrode plates of the respective adjacent cells to separate such cells from one another at least as far as fluid transfer therebetween is concerned.

When the electrochemical device is constructed and operated to perform electrolysis of water, water has to be supplied into the cell and to at least one of the active areas. In operation, electrolytic reaction takes place in the respective cell upon application of different electrical potentials to its electrode plates, resulting in the generation of product gases (hydrogen and oxygen) at the respective active areas of the respective electrode plates. Such gases have to be separately conducted away from such active areas and eventually separately discharged from the cell. On the other hand, when the device is to serve as an electric power generator, hydrogen (or another gaseous fuel) and oxygen (as such or as an ingredient of air) have to be separately admitted into the cell and separately distributed over the active areas of the anode and cathode electrode plates, respectively, whereupon an electrochemical reaction occurs resulting in the creation of an electrical potential difference between the anode and cathode electrode plates. This potential difference is utilized, in conjunction with that created in the other fuel cells arranged in the stack, to supply electric power to an external user device or circuit. The water that is formed in the cell as the reaction product must be conveyed away from the location at which it is produced and ultimately removed from the fuel cell.

It may be seen that, in each case, provisions have to be made not only for separate admission of the respective starting substance(s) to and discharge of the respective product(s) from the cathode and anode portions or sides of each of the cells, but also for substantially uniform distribution of each such substance over the respective active area and removal of each such product from all regions of the affected active area. The latter task is typically accomplished by providing at least those otherwise solid regions of the electrode plates which underlie the active areas with interconnected passageways that open onto the affected active areas and communicate with respective admission or discharge passages, such as by giving each of such regions a porous structure. Besides providing for an orderly management of flow of the various fluids toward or away from the active areas and providing electrically conductive paths between the active areas and the electrically conductive separator plates or similar plate-shaped components, this approach achieves a pronounced advantage of such electrode plate regions serving as supports for the electrolyte confinement body that prevent such body from buckling or other deformation that may adversely affect the operation or integrity of such a body and, consequently, of the electrochemical cell and/or device as a whole.

Especially when the electrochemical device is constructed to employ a solid electrolyte membrane as the electrolyte confinement body in each of its cells, it has to be operated at high, and often very high, superatmospheric pressures. While this requirement would not create any problems were the entire device (that is, both its interior and its exterior) subjected to only negligibly different pressures, for instance, by accommodating the device in a confining vessel and maintaining the pressure in the vessel around the device at the same level as, or at a level acceptably lower (or higher) than, that prevailing in the interior of the device, the provision of such a confining vessel significantly adds to the complexity and cost of the equipment and, moreover, considerably increases the overall dimensions and weight of the equipment, which makes this approach unsuited for use in applications where either the amount of available space, or the acceptable weight, or both, are either limited or at a premium.

On the other hand, when such pressure equalization measures cannot be taken, the existence of the pressure differential between the interior and the exterior of the electrochemical device imposes considerable strains on the peripheral portions of the individual cells and also puts high demands on the fluid impermeability of the various components of the electrochemical cell device and the interfaces therebetween.

To deal with the various requirements mentioned above, it has already been proposed to construct the electrode plates in such a manner that each of them includes a solid, fluid-impervious annular frame that constitutes the peripheral portion, and a fluid pervious (and electrically conductive) central portion that fills the space bounded by the frame. The interfaces between the frames are then properly sealed, usually by interposing discrete seals between such frames.

In at least one known cell construction employing these principles, each of the frames (as well as each of the intermediate separator plates or similar plate-shaped intermediate members) includes a plurality of through apertures or slots that are aligned, in the assembled condition of the electrochemical device, with corresponding slots or apertures of the other components to collectively constitute respective fluid supply and discharge conduits or manifolds. Moreover, it is necessary to provide individual connecting passages in each of the electrode plate frames to establish communication in the assembled device between the thus formed manifolds and the voids in the central portions of the appropriate ones of the electrode plates.

The making of such passages does not pose much of a problem when the frame is of a highly elastic material, especially a synthetic plastic material such as polyimide, inasmuch as the electrode plate or the frame can then be bent, without undergoing permanent deformation, out of the way to gain easy access to the respective portion of internal surface of the frame from which a material-removing operation such as drilling is to be conducted to form the respective passage leading to and terminating in the associated manifold.

Yet, despite the fact that there is a pronounced need or desire for operating electrochemical cell devices, especially those of the solid electrolyte type, at relatively high internal pressures, there is a limit to the pressure differential between the interior and the exterior of the device, beyond which materials of this kind are no longer suited for use. On the other hand, most if not all other materials that would satisfy the requirements put on them in the environment of such a device in all other respects while being additionally capable of withstanding higher pressure differentials, especially metallic materials, are not amenable to this passage forming expedient, so that other, more expensive, approaches would have to be used to produce such passages. Accordingly, it is a general object of the present invention to avoid the disadvantages of the prior art.

More particularly, it is an object of the present invention to provide an electrochemical cell device including a stack of juxtaposed individual cells, which device does not possess the disadvantages of the known devices of this kind.

Still another object of the present invention is to devise an electrochemical cell device of the type here under consideration that would be capable of operation at a very high pressure differential between the interior and the exterior thereof.

It is yet another object of the present invention so to develop the electrochemical cell device of the above type as to assure easy and reliable assembly thereof and, when assembled and operated, the desired flow of the starting substance(s) and reaction product(s) between the respective manifolds and the respective internal regions of the device and proper distribution of the starting substance(s) to the active area(s) of the electrode(s).

A concomitant object of the present invention is to design the device of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in an electrochemical cell electrode plate which includes a laminar assembly of at least two substantially identically configured plate-shaped components of an electrically conductive high-strength material, these components having first major surfaces that are juxtaposed with one another in the assembly, and oppositely facing second major surfaces. Each of these components includes a central portion having a multitude of fluid-flow spaces that communicate with the spaces of the respective other of the components in the assembly, and a solid frame portion integral with and circumferentially surrounding the central portion and provided with at least one through aperture therein. This aperture opens onto the first and second major surfaces and is aligned with the aperture of the other of the components in the assembly to form a continuous fluid-flow conduit therewith. In accordance with the present invention, the frame portion of each of the components has at least one channel therein that is situated between the aperture and the central portion and opens onto the first major surface. The channels of the two components communicate with one another in the assembly and thus complement each other into a continuous passage that establishes communication between the aperture and at least one of the spaces of the central portion of one of the components. Advantageously, the channels are constituted by respective rows of separate sub-channels or slots, with the slots of one of the two components partially overlapping those of the other component in the assembly to form the passage and give it a tortuous course.

A particular advantage of this approach is that, because the passage is partially formed in one of the components and partially in the other, the affected frame region of neither one of these components is weakened to the extent where its ability to withstand stresses would be compromised. Also, inasmuch as each of the channels opens on at least one of the major surfaces of the respective component that is easily accessible prior to the formation of the assembly, rather than being fully contained within the frame portion, the fabrication of such channel involves a simple and inexpensive procedure.

BRIEF DESCRIPTION OF THE DRAWING

The present invention will be described in more detail below with reference to the accompanying drawing in which.

BEST MODE FOR CARRYING OUT THE INVENTION

Figure 1:
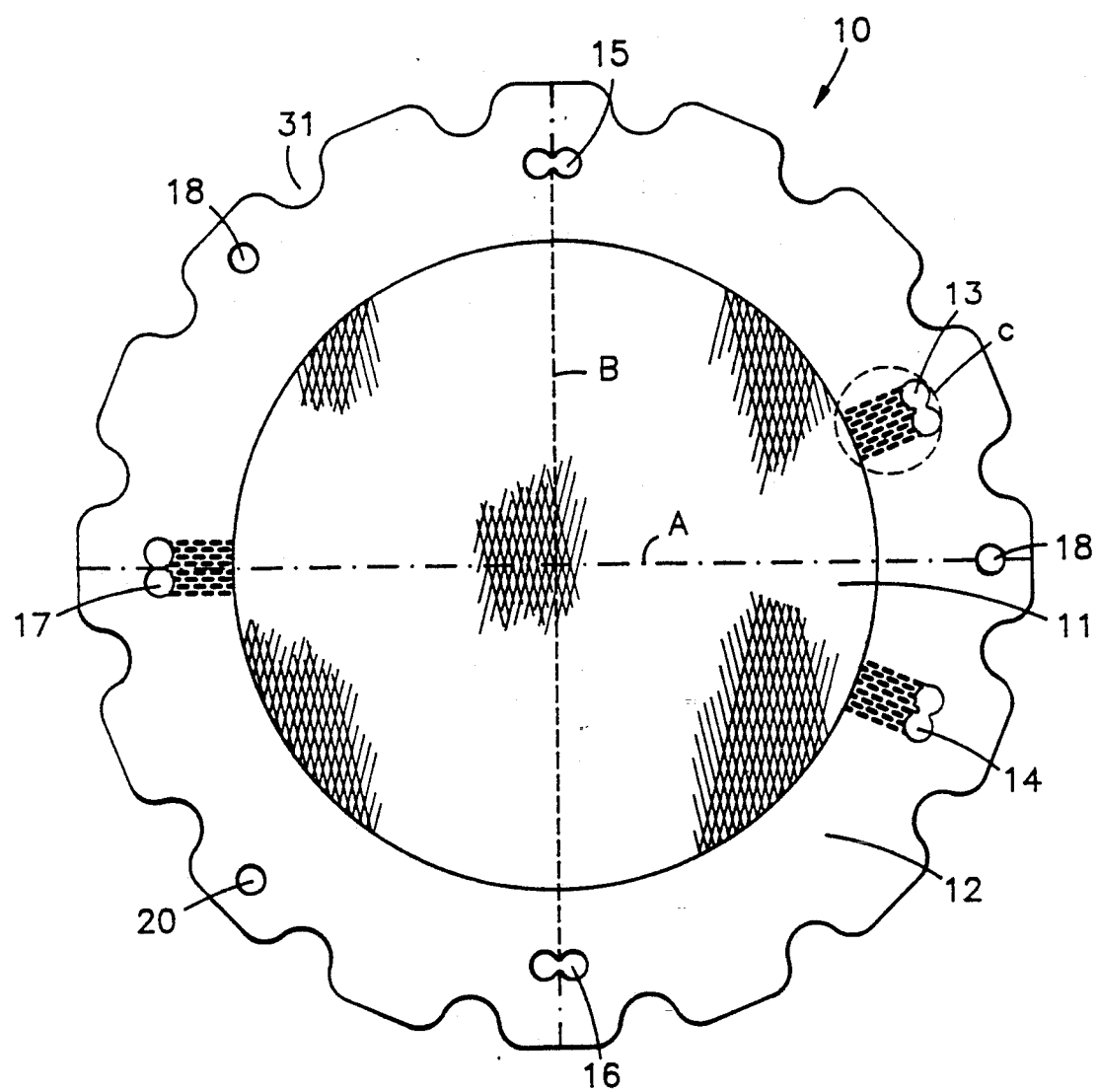
FIG. 1 is a top plan view of a plate-shaped component of an anode plate that is constructed in accordance with the present invention for use in an electrochemical cell.

Referring now to the drawing in detail, and first to FIG. 1 thereof, it may be seen that the reference numeral 10 has been used therein to identify a plate-shaped component constructed in accordance with the present invention for use, in conjunction with other plate-shaped components of the same or similar type, in one type of a laminar electrode member for use in an electrochemical cell assembly or stack of an electrochemical cell device. While a device of this type can be used either as an electrolysis apparatus or as a fuel cell device, depending on the requirements, it will be described below, for the sake of simplicity, predominantly as being used for electrolysis.

Before discussing the present invention, it is to be mentioned that, except for the use of the novel components according to the present invention therein, the electrochemical cell device is of any known construction, and operates in accordance with well known principles, so that it does not have to be explained here in detail. Suffice it to say that the electrochemical cell assembly or stack usually includes a multitude of individual electrochemical cells juxtaposed with one another and separated from each other by respective separator plates, each of such cells including an anode electrode plate and a cathode electrode plate, with a matrix or a similar body (such as a membrane) that contains either liquid or solid electrolyte or another ion exchange medium being interposed at least between respective active areas of the cells that are typically constituted by respective catalyst or catalyst-containing layers.

It also ought to be mentioned at this juncture that the various cell components constituting the electrode and separator or end plates in the electrochemical cell device of the present invention are similar in so many respects, having substantially the same outline and sharing so many features, that it is deemed to be sufficient to describe only the aforementioned plate-shaped component 10 in some detail here, and to merely point out the differences between the other such components and the component 10.

The illustrated component 10 is configured or designed to constitute a part of either an anode or a cathode electrode plate or member. To be able to be employed in this capacity, the component 10 has to be, at least in part, electrically conductive and fluid-permeable. To satisfy the latter requirement, the component 10 includes a fluid-permeable central portion 11 and an essentially solid (fluid-impermeable) peripheral or frame portion 12 that circumferentially completely surrounds the central portion 11. The portions 11 and 12 are integral with one another in the illustrated construction of the component 10, with the central portion 11 being formed by a mesh produced by a material-removing technique from the same sheet of material as the frame portion 12. Advantageously, the unitary component 10 is made of a metallic material, as are the other aforementioned components. This choice of material for the component 10 not only assures good electrical conductivity of at least the central portion 11, but also a very high mechanical strength especially of the frame portion 12 so that the latter is capable of withstanding very high pressure differentials which may act in the radial directions of the component 10 when the latter is incorporated in the cell stack and the electrochemical device is operated. In this case, the material-removing technique used for producing the aforementioned mesh may advantageously entail etching, such as photoresist assisted or laser assisted etching.

As also shown in FIG. 1 of the drawing, the otherwise solid frame portion 12 of the component 10 is provided with several circumferentially spaced through apertures 13, 14, 15, 16 and 17, of which the apertures 13 and 14, on the one hand, and the apertures 15 and 16, on the other hand, are situated symmetrically with respect to an axis A of the component 10, while the aperture 17, which extends across the axis A, is symmetrical with respect to the latter. Furthermore, the apertures 15 and 16 extend across, and are symmetrical with respect to, an axis B that extends normal to the axis A through the center of the component 10.

Because of this symmetrical arrangement, such apertures 13 to 17 of all such components collectively form, when the component 10 is assembled with the other aforementioned components in the proper relative orientations to form the electrochemical cell stack, respective conduits or manifolds through which various fluids needed during or generated in the course of the electrochemical reaction taking place in the individual cells are conducted to or away from the respective cells, and more particularly separately to and from the respective anode and cathode sides thereof. To aid in assuring that the various components be assembled in the aforementioned proper relative orientations that will be explained in more detail later, the component 10 (and, similarly, all the other components) is provided in its frame portion 12 with a plurality (as shown, three) through positioning holes 18, 19 and 20 that are to serve for receiving respective positioning pins (which are not shown in the drawing) at least during the assembly of the electrochemical cell stack. The holes 18 to 20 are arranged symmetrically with respect to the axis A but are circumferentially spaced from one another by angles different from 120° in the illustrated construction (or, generally, 360°/n where n is the number of such holes). It may be seen that, because of this arrangement of the holes 18 to 20 and thus of the positioning pins extending therethrough while the stack is being assembled, the component 10 (or any other component) cannot be assembled with the other components, when the positioning pins are present, in any other position than that shown in the drawing, or that in which such component is flipped over (i.e. turned through 180° about the axis A) relative to such illustrated initial position. The significance of and reason for this flipping-over possibility will become apparent later.

Figure 2:
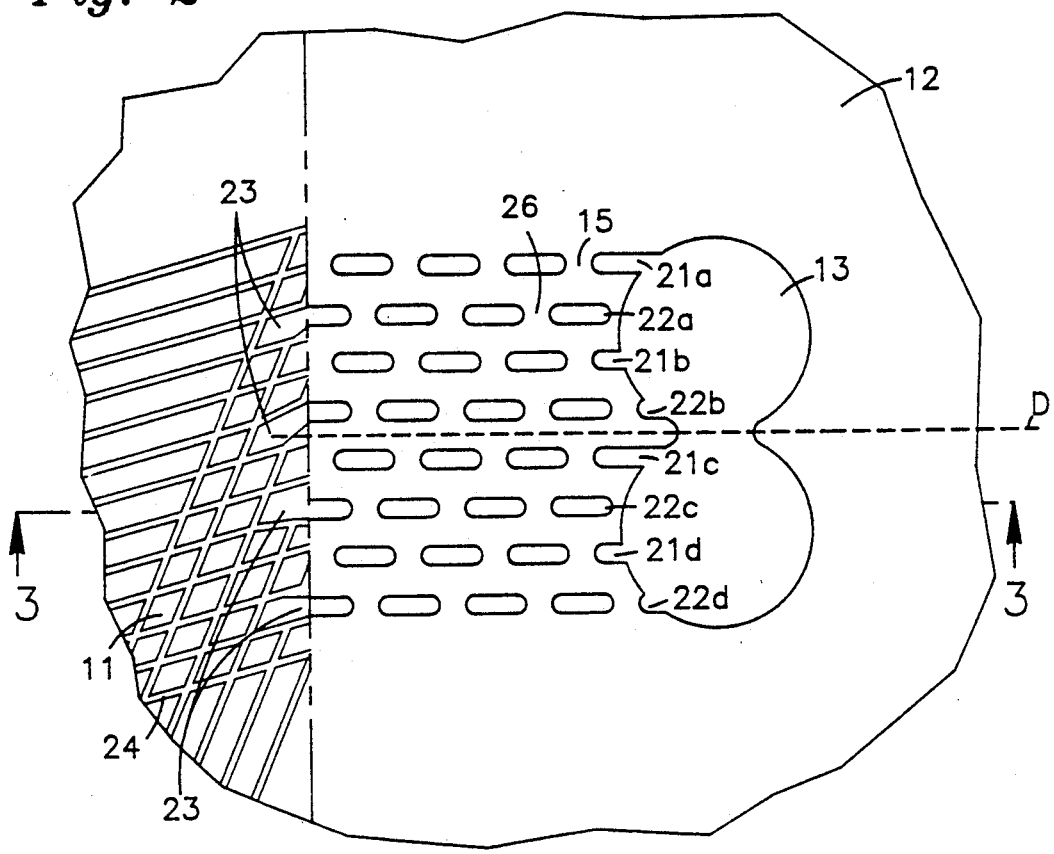
FIG. 2 is a top plan view, at an enlarged scale, of a detail C of FIG. 1.

Turning now to FIG. 2 of the drawing, which illustrates a detail C of FIG. 1 at a somewhat enlarged scale, it is to be mentioned first that the aperture 13 shown therein is symmetrical with respect to an auxiliary axis D. Respective interrupted rows of slots 21a to 21d and 22a to 22d extend in the frame portion 12 from the aperture 1 to the central portion 11. For the sake of brevity, such slots 21a to 21d, on the one hand, and 22a to 22d, on the other hand, will be referred to hereafter as first-type slots 21 and second-type slots 22, unless it becomes necessary to identify them with more particularity. Some of the slots 21 and 22 communicate with the aperture 13 and others open into respective spaces 23 delimited in the central portion 21 by respective partitioning walls 24 that collectively form the aforementioned mesh. As shown, the radially outward slot of each row of first-type slots 21 communicates with the aperture 13, and the radially inward slot of each row of second-type slots 22 opens into the respective space 23.

The individual slots 21 and 22 are separated from one another, in the respective rows, by respective solid separating portions, such as those indicated in the drawing at 25 and 26, with the dimensions of the slots 21 or 22 as considered along the course of the respective slot row exceeding the corresponding dimensions of the separating portions 26 and 25, respectively, of the other row of slots 22 or 21. Moreover, the slots 21 are staggered (offset in the direction of the auxiliary axis D) relative to the slots 22, such that the respective slot 21 spans and extends beyond any transversely adjacent separating portion 26 of the row of slots 22, and vice versa.

Corresponding ones of the rows of first-type and second-type slots 21 and 22 follow corresponding (as shown, parallel) courses spaced by corresponding distances from the auxiliary axis D. However, the arrangement of the rows of slots 21 and 22 relative to the auxiliary axis D is such that the auxiliary axis D is flanked, at each of such corresponding distances, by one row of the first-type slots 21 and by one row of the second-type slots 21. As shown, the rows of slots 21 and 22 alternate with one another, resulting in a honeycomb-like structure of the affected region of the frame portion 12, which does not adversely affect the ability of the frame portion 12 to withstand the aforementioned pressure differentials or other stresses imposed thereon.

Figure 3:
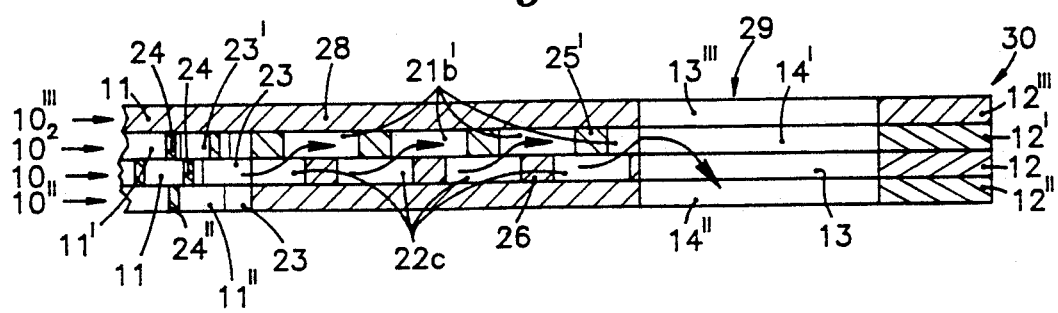
FIG. 3 is a sectional view, taken along the line 3—3 of of a fragment of an anode plate for use in an electrochemical cell, incorporating the plate-shaped component of FIG. 1 and other, similar, plate-shaped components.

The reason for using this expedient will become apparent from observing FIG. 3 of the drawing which shows the component 10 as used in conjunction with other, identical or similar, components 10', 10" and 10''' (in conjunction with which the same reference numerals as before but supplemented with single, double or triple primes, as appropriate, are being used to identify corresponding parts) to jointly form an electrode (in this case, anode) plate 30. The component 10' is identical to the component 10, but it is arranged in a flipped-over position explained above with respect to the component 10, so that the first-type slots 21b' thereof are juxtaposed with the second-type slots 22d of the component 10. Furthermore, the component 10''' (which may be a separator plate serving to separate two adjacent electrochemical cells from one another, or an end plate of the stack) has a portion 28 that encompasses both the frame portion 12''' and the central portion 11''' and is solid except for the presence therein of the aperture 13''' (which may be absent when the component 10''' is an end plate to dead-end the respective stack manifold). On the other hand, the (again flipped-over) component 10" has a frame portion 12" that, except for the presence of the aperture 14" therein, is solid (i.e. does not include at least one, but preferably both, of the slot type rows mentioned before), but the central portion 11" thereof is constituted by the aforementioned mesh. Upon assembly of the electrochemical cell stack, the component 10" of the electrode plate 30 is adjoined, as usual, by a solid electrolyte membrane of a known type which, in turn, is adjoined by an opposite polarity (e.g. cathode) plate of a construction similar to that described above, with certain modifications that will be addressed later. These parts of the cell assembly or stack have not been shown in the drawing in order not to unduly encumber the same.

It may be seen in FIG. 3 that the apertures 13''', 14', 13 and 14", in succession, are aligned with one another to form a stack manifold 29 (together with similarly arranged corresponding apertures provided in the omitted solid electrolyte plate(s) and other type of electrode plate(s), as well as other electrode(s) 30 of the same type that may be present in the cell stack). It is also evident that, because of their staggered arrangement and respective lengths relative to the associated separating portions 26 and 25', the illustrated slots 22c and 21b', which individually constitute discontinuous partial channels, complement each other to jointly form a somewhat tortuous and yet continuous path between the space 23 and the manifold 29 for the flow of a fluid therethrough, as indicated by respective arrows. On the other hand, the solid portion 28 of the component 10''' and the solid frame portion 12" of the component 10" delimit this path in the vertical directions as considered in FIG. 2.

Furthermore, as a comparison of FIG. 3 with FIG. 2 of the drawing will reveal, the partitioning walls 24, which form a diamond pattern, extend along courses that are slanted relative to the auxiliary axis D at such angles that, when the components 10, 10' and 10" are assembled with one another in the manner shown in FIG. 3, the respective spaces 23, 23' and 23" are in communication with one another in that the partitioning walls 24, 24' and 24" are not aligned with one another, thus permitting the aforementioned fluid to flow through such spaces 23, 23' and 23" to (or from) the aforementioned passage (and/or to or from the passages similarly formed by the other slots 21 and 22). Yet, the meshes formed by the partitioning walls 24, 24' and 24" are strong enough, and are in sufficient area contact with one another, to avoid buckling thereof, or of the non-illustrated solid electrolyte membrane, when subjected to forces acting in the vertical direction as considered in FIG. 3.

In the particular construction illustrated in FIGS. 1 to 3 of the drawing, which is intended for use in electrolytic dissociation of water, the apertures 17 are to be used for introduction of liquid water to the anode electrode plate 30, and both of the apertures 13 and 14 in parallel for discharge of a mixture of water and oxygen from the anode electrode plate 30. The reason for this expedient is that the volumetric flow rate of the mixture exceeds that of the introduced water and is also greater than that which could be handled by a single manifold/passage combination without compromising the structural integrity of the frame portion 12 at the affected region. It should be realized that the conditions described above in conjunction with the area illustrated in FIGS. 2 and 3 are present at or equivalently applicable to the regions of the apertures 17 and 14 as well as far as the anode plate 30 is concerned.

Furthermore, a similar situation is encountered in the non-illustrated cathode plate as well, except that this time first-type and second type slots akin to the slots 21 and 22 extend between the apertures 15 and/or 16 and the corresponding spaces of the central portion, while the regions situated between the apertures 13, 14 and 17 and such central portions are solid, like the regions between the apertures 15 and 16 and the central portion 11 are in FIG. 1. The flip-over still takes place about the axis A, which means that the each first-type slot associated with the aperture 16 has to be aligned across the axis A with a corresponding second-type slot associated with the aperture 15, and vice versa.

FIG. 1 of the drawing also shows that the component 10 has a lobed outline, including recesses such as 31. These recesses 31 serve to partially accommodate respective bolts or similar tightenable elements that extend along the stack and, when tightened, not only hold the various parts of the stack together, but also exert forces directed in their longitudinal directions against such parts so as to press them against one another in succession sufficiently to prevent leakage between the exterior and interior of the electrochemical cell stack through interfaces between the various components or members thereof.

In this connection, it is to be mentioned with reference particularly to FIG. 3 of the drawing that, while that respective discrete sealing elements may be disposed in the respective interfaces to provide the requisite sealing effect, it has been found to be particularly advantageous, in accordance with another aspect of the layer, to provide the anode plate 30 (and, similarly, the non-illustrated cathode plate) as a laminated unit, or even to form so-called bipolar plates each of which consists of the aforementioned anode and cathode plates belonging to the adjacent electrochemical cells in the stack in a back-to-back arrangement with an intervening share separator plate, such as 10''', in between, as laminated units to be used throughout the stack except at the respective ends thereof. In this context, it is to be mentioned that there are several materials that are contemplated and suitable for use as the laminating substances. Examples of such materials are various epoxy resins, silicon and Fluorel ® elastomers and Teflon ® FEP (fluoroethylene propylene), which may be applied to the affected regions of the frame portions of the various components, such as 10, 10', 10'' and/or 10''' as liquids in the form of coatings, or in their solid form as discrete films or layers. Prior to the application, it is advantageous to prepare the affected surfaces to improve the eventual adhesion or bonding, such as by etching such surfaces followed by so-called vapor blasting which entails directing a jet of an aqueous slurry containing abrasive particles against the surfaces to be treated. After the application and assembly of such components, there is conducted a laminating process which involves subjecting the respective assemblies to elevated temperatures and pressures. The values of such temperatures and pressures are dictated by the types of the materials that are being used as the bonding or laminating agents, and are well known for the materials in question.

Excellent results have been obtained by using niobium or zirconium as the material of the various components of the respective electrode plates, such as 30. It has been established that such materials have sufficient strengths to withstand internal pressures on the order of 6000 psi (with the external pressure being at the atmospheric pressure level) without suffering damage. These materials also possess sufficient electrical conductivity to be usable in the electrochemical cell environment, and are compatible with the media supplied to or generated in the respective cells (water, hydrogen or other gaseous fuel, oxygen) in that they are inert with respect to or at least not adversely affected by such media (for instance, due to excessive oxidation).

While the present invention has been illustrated and described as embodied in a particular construction of an electrochemical cell device and more particularly such to be used for conducting an electrolytic process, it will be appreciated that the present invention is not limited to this particular example; rather, the scope of protection of the present invention is to be determined solely from the attached claims.

We claim:

1. An electrochemical cell electrode plate structure comprising a laminar assembly of at least two substantially identically configured plate-shaped components of an electrically conductive high-strength material having first major surfaces that are juxtaposed with one another in said assembly, and oppositely facing second major surfaces, each of said components including a central portion having a multitude of fluid-flow spaces that communicate with spaces of the respective other of said components in said assembly, and a solid frame portion integral with and circumferentialy surrounding said central portion and provided with at least one through aperture therein that opens onto said first and second major surfaces and is aligned with said aperture of the other of said components in said assembly to form a continuous fluid-flow conduit therewith, and said frame portion of each of said components having at least one discontinuous partial channel therein that is situated between said aperture and said central portion and opens onto said first major surface, said discontinuous partial channels of said two components communicating with one another in said assembly to complement each other into a continuous passage that establishes communication between said aperture and at least one of said spaces of said central portion of one of said components.

2. The electrode plate structure as defined in claim 1, wherein each of said discontinuous partial channels is constituted by a plurality of successive elongated sub-channels that are separated from one another by respective solid regions of the respective frame portion and extend in respective rows along the course of said passage, being staggered relative to one another as between the rows along said course in such a manner as to only partially overlap one another, with one of asid sub-channels that is disposed at one end of said course communicating with said aperture and another one of said sub-channels that is situated at the other end of said course being in communication with said one space.

3. The electrode plate structure as defined in claim 2, wherein each of said sub-channels is configured as a slot that additionally opens onto said second major surface of the respective one of said components; and wherein said laminer assembly further includes at least two additional components similar to said two components and confining said two components between said two additional components in said assembly, at least one of said additional components also having said aperture that is aligned with said apertures of said two components in said assembly, but said frame portions of both of said additional components being solid between said apertures and said central portions to span the respective ones of said slots and thus delimit said passage in said assembly.

4. The electrode plate structure as defined in claim 3, wherein said central portion of only one of said two additional components is solid.

5. The electrode plate structure as defined in claim 3, wherein said two components and said two additional components are laminated to one another in said assembly.

6. The electrode plate structure as defined in claim 2, wherein said frame portion of each of said components further has at least one further row of said sub-channels that extends along a course situated symmetrically with respect to a flip-over axis relative to that of said row, with said sub-channels of said row and said further row being staggered along their respective courses relative to one another in such a manner that, in said assembly with said first surfaces of said two components being in juxtaposition with one another and said flip-over axes of said two components being aligned, said sub-channels of said row of one of said two components partially overlap said sub-channels of said further row of the other of said two components, and said sub-channels of said further row of said one component partially overlap said sub-channels of said row of said other component.

7. The electrode plate structure as defined in claim 6, wherein said central portion of each of said two components is constituted by a plurality of partitioning walls spanning the entire distance between said first and second major surfaces and intersecting one another to form a mesh structure and to bound said fluid-flow spaces of each of said central portions between themselves and with said frame portion; and wherein said partitioning walls of said two components are so oriented with respect to said flip-over axes that said fluid-flow spaces of said two components communicate with one another in said assembly across an interface between said central portions.

8. The electrode plate structure as defined in claim 2, wherein said frame portion of each of said two components further has at least one additional aperture therein with said aperture and said additional aperture being situated symmetrically with respect to a flip-over axis, and at least one further row of said sub-channels that extends along a course extending between said additional aperture and said central portion of the respective component and situated symmetrically with respect to said flip-over axis relative to that of said row, with said sub-channels of said row and said further row being staggered along their respective courses relative to one another in such a manner that, in said assembly with said first surfaces of said two components being in juxtaposition with one another and said flip-over axes of said two components being aligned, said sub-channels of said row of one of said two components partially overlap said sub-channels of said further row of the other of said two components, and said sub-channels of said further row of said one component partially overlap said sub-channels of said row of said other component.

* * * * *